US012203316B2

(12) United States Patent
Friedli

(10) Patent No.: US 12,203,316 B2
(45) **Date of Patent: *Jan. 21, 2025**

(54) ACCESS CONTROL SYSTEM FOR A SLIDING DOOR WITH AN OBJECT MONITORING FUNCTION

(71) Applicant: INVENTIO AG, Hergiswil (CH)

(72) Inventor: Paul Friedli, Remetschwil (CH)

(73) Assignee: Inventio AG, Hergiswil (CH)

(*) Notice: Subject to any disclaimer, the term of this patent is extended or adjusted under 35 U.S.C. 154(b) by 785 days.

This patent is subject to a terminal disclaimer.

(21) Appl. No.: 17/353,633

(22) PCT Filed: Dec. 3, 2019

(86) PCT No.: PCT/EP2019/083530
§ 371 (c)(1),
(2) Date: Jun. 21, 2021

(87) PCT Pub. No.: WO2020/126483
PCT Pub. Date: Jun. 25, 2020

(65) Prior Publication Data
US 2022/0074255 A1 Mar. 10, 2022

(30) Foreign Application Priority Data
Dec. 21, 2018 (EP) .................................... 18215367

(51) Int. Cl.
*E05F 15/76* (2015.01)
*E05F 15/632* (2015.01)
(Continued)

(52) U.S. Cl.
CPC ............ *E05F 15/76* (2015.01); *E05F 15/632* (2015.01); *G07C 9/32* (2020.01); *G08B 21/182* (2013.01);
(Continued)

(58) Field of Classification Search
CPC .......... E05F 15/632; E05F 15/76; G07C 9/32; G08B 21/182
(Continued)

(56) References Cited

U.S. PATENT DOCUMENTS 5,400,722 A * 3/1995 Moses ...................... G07C 9/25 109/9
5,541,585 A * 7/1996 Duhame .................. G07C 9/28 235/382
(Continued)

FOREIGN PATENT DOCUMENTS

CN 103985175 A 8/2014
CN 104680618 A 6/2015
(Continued)

*Primary Examiner* — Gregory J Strimbu
(74) *Attorney, Agent, or Firm* — Wiggin and Dana LLP

(57) ABSTRACT

A system for controlling access to a restricted area in a building includes a sliding door system and a controller. The sliding door system has a door frame and a sliding door which can be moved in the door frame between a closed position and an open position. The door frame has a passage region and a wall shell region which at least partially accommodates the sliding door in the open position. The sliding door has an end face which faces the passage region in the open position. The controller has a processor unit and a sensor unit. The controller is designed to generate an alarm signal if a height of an object in the passage region, as determined by the sensor unit, deviates from a height range stored for the object.

11 Claims, 2 Drawing Sheets

(51) Int. Cl.
*G07C 9/32* (2020.01)
*G08B 21/18* (2006.01)
*E05F 15/73* (2015.01)

(52) U.S. Cl.
CPC ... *E05F 2015/767* (2015.01); *E05Y 2201/434* (2013.01); *E05Y 2400/40* (2013.01); *E05Y 2400/44* (2013.01); *E05Y 2400/52* (2013.01); *E05Y 2400/852* (2013.01); *E05Y 2600/46* (2013.01); *E05Y 2800/426* (2013.01); *E05Y 2900/14* (2013.01)

(58) Field of Classification Search
USPC ............................................................ 49/358
See application file for complete search history.

(56) References Cited

U.S. PATENT DOCUMENTS

| | | | | | |
|---|---|---|---|---|---|
| 5,581,944 | A * | 12/1996 | Kornbrekke | E05F 15/42 49/27 |
| 6,084,367 | A * | 7/2000 | Landert | E05F 15/608 318/283 |
| 6,418,235 | B1 * | 7/2002 | Morimoto | G06F 18/00 340/5.83 |
| 7,400,744 | B2 * | 7/2008 | Nichani | G06V 20/52 382/153 |
| 8,773,263 | B2 * | 7/2014 | Thibault | G08B 13/08 200/61.93 |
| 11,993,974 | B2 * | 5/2024 | Friedli | E06B 3/4654 |
| 2002/0154012 | A1 * | 10/2002 | Risi | E05F 15/632 340/541 |
| 2007/0047837 | A1 | 3/2007 | Schwab et al. | |
| 2010/0050530 | A1 * | 3/2010 | Blasi | E05D 15/1042 49/358 |
| 2018/0238096 | A1 * | 8/2018 | Liberda | E05F 15/646 |
| 2019/0226265 | A1 * | 7/2019 | Ahmad | G05B 19/416 |
| 2020/0217123 | A1 * | 7/2020 | Minoike | G06Q 30/0272 |
| 2021/0110626 | A1 * | 4/2021 | Salomon | G07C 9/32 |
| 2022/0074255 | A1 * | 3/2022 | Friedli | E05F 15/76 |
| 2023/0175307 | A1 * | 6/2023 | Friedli | E06B 3/4654 49/31 |
| 2023/0313595 | A1 * | 10/2023 | Vonaesch | E05F 15/73 49/31 |

FOREIGN PATENT DOCUMENTS

| | | | |
|---|---|---|---|
| CN | 105405186 | A | 3/2016 |
| CN | 107154124 | A | 9/2017 |
| CN | 108091005 | A | 5/2018 |
| CN | 108806137 | A | 11/2018 |
| DE | 102016119343 | A1 | 4/2018 |
| EP | 1241312 | A2 | 9/2002 |
| EP | 2876241 | A1 | 5/2015 |
| WO | 2010112586 | A1 | 10/2010 |
| WO | 2018069341 | A1 | 4/2018 |

* cited by examiner

ACCESS CONTROL SYSTEM FOR A SLIDING DOOR WITH AN OBJECT MONITORING FUNCTION

CROSS-REFERENCE TO RELATED APPLICATIONS

This application is the national phase application under 35 U.S.C. § 371 claiming the benefit of priority based on International Patent Application No. PCT/EP2019/083530, filed on Dec. 3, 2019, which claims the benefit of priority based on European Patent Application No. 18215367.6 filed on Dec. 21, 2018. The contents of each of these applications are hereby incorporated by reference in their entirety.

FIELD OF THE INVENTION

The technology described here relates generally to an access control system for a building. Embodiments of the technology relate in particular to an access control system comprising a building sliding door and to a method for operating the access control system.

BACKGROUND OF THE INVENTION

Access control systems can be designed in the most varied of ways in order to grant or deny people access to a restricted area. The embodiments may relate, for example, to the way in which persons (users) must identify themselves as authorized to enter, e.g., using a key, a magnetic card, a chip card or an RFID card or using a mobile electronic device (e.g., mobile phone). WO 2010/112586 A1 describes an access control system in which a user who is authorized to enter is shown an access code on a display on a mobile phone that the user carries. If the user holds the mobile phone up to a camera such that said camera can capture the displayed access code, the access control system grants the user access if the access code is valid.

The design of an access control system can also relate to the way in which access is granted or denied to people, for example through doors, locks or barriers. It is known, for example, that an electronic lock is arranged on a door, at which an access code must be entered so that the door can be unlocked and opened. In addition to this unlocking function on a door, it is known to monitor passage through the door. WO 2018/069341 A1 describes, for example, a device that uses sensors to monitor whether and which objects are moving through a door. To monitor objects by means of infrared image recording and infrared pulse lighting, the device has a stereometric object recognition device consisting of a radiation source and an image recording device, which is fastened in a stationary manner near a wall or a door frame. The object recognition device determines the geometric dimensions of an object (person, car) in order to determine how far the door needs to be opened for the object to pass through. The aim is to ensure the comfort and safety of the passing object: for example, a person walking or driving should feel safe when passing through the door.

The systems mentioned relate to different requirements of access control and related designs of access control systems. In addition to these known requirements, there are further requirements, for example due to changing lifestyles or living conditions (e.g., dense living in apartments in a city), including a need for increased security and increasing automation of and in buildings. There is therefore a need for technology for an access control system that meets these requirements, with the access control having to take into account, in particular, the need for security without negatively affecting the comfort for users.

SUMMARY OF THE INVENTION

One aspect of such technology relates to a system for controlling access to a restricted area in a building. The system has a sliding door system and a controller for the sliding door system. The sliding door system has a door frame and a sliding door which can be displaced in the door frame between a closed position and an open position by a drive unit actuated by the controller. The door frame has a passage region and a wall shell region which at least partially accommodates the sliding door in the open position. The sliding door has an end face which points toward the passage region in the open position. The controller has a processor unit and a sensor unit, the sensor unit being arranged on the end face of the sliding door and the processor unit being arranged in an inner space of the sliding door and electrically connected to the sensor unit and the drive unit. The controller is designed to generate an alarm signal if a height of an object in the passage region, as determined by the sensor unit, deviates from a height range stored for said object.

Another aspect of the technology relates to a method for operating a system for controlling access to a restricted area in a building. The system has a sliding door system and a controller for the sliding door system. According to the method, a drive unit of the sliding door system is actuated by the controller in order to open a passage region of a door frame for an object by moving a sliding door from a substantially closed position to an open position, with part of the sliding door sliding into a wall shell region of the door frame. The sliding door has an end face which points toward the passage region in the open position. A sensor unit arranged on the end face is activated by a processor unit of the controller. The sensor unit is designed to determine a height of an object in the passage region. An alarm signal is generated by the controller if the height of the object in the passage region, as determined by the sensor unit, deviates from a height range stored for said object.

The technology described here provides an access control system that allows a plausibility check based on a determination of the height of the object. This means that it is not only checked whether the object is authorized to enter, which leads to the sliding door being opened, but also whether the determined height matches the object passing through the passage region. As a result, the effectiveness of the access control can be improved, in particular in situations in which the object is not a person but, for example, a pet or a robot.

In one embodiment, the technology uses a recognition device that is arranged on the sliding door system or in the vicinity thereof and is communicatively connected to the controller. The recognition device is designed to capture and check credentials presented by the object. It is advantageous here that the type of credentials and, accordingly, the recognition device can be selected depending on the requirements in the building. The recognition device can, for example, be a transceiver for radio signals, a device for capturing a biometric feature, a device for capturing an optical code, a reader for a magnetic stripe card or a chip card, or a keypad or a touch-sensitive screen for manually entering a password, or a mechanical or electronic door lock.

Credentials allow the access authorization of the object to be checked. In one embodiment, if the credentials are valid for the object, the processor unit determines a record in a storage device in which the credentials are assigned to an opening width of the sliding door and the height range. The record can be managed by a person responsible for the restricted area (tenant, owner, building manager, etc.).

In one embodiment, the sliding door system has an interface device which is arranged on the sliding door and is designed to send data to and/or receive data from a building management system. The building management system can be arranged in the building or at a distance therefrom.

In one embodiment, the drive unit is arranged on the sliding door. This means that not only the processor unit and the sensor unit are arranged on the sliding door, but also the drive unit. As a result, maintenance and/or repair work can be carried out with relatively little effort: for example, the sliding door can be entirely or partially removed from the door frame in order to gain access to the components arranged on the sliding door. This also makes it possible to replace a defective sliding door with a new sliding door or a temporary replacement sliding door while the defective sliding door is being repaired in a workshop.

The technology described here also has an advantage that its use is not restricted to a specific type of sliding door system. In one embodiment, the sliding door can comprise an actuator which is designed to position the door leaves in a first position with a first leaf spacing when the sliding door is in the closed position and in a second position with a second leaf spacing when the sliding door is in the open position. The first leaf spacing is greater than the second leaf spacing.

According to the technology described here, the access control system can be equipped with additional functions in order to reduce the possibility of the access control being manipulated and/or bypassed. In one embodiment, the controller can determine a dwell time for the object in the passage region and compare it with a defined dwell time. The defined dwell time can also be stored in the record of the object. If the defined dwell time is exceeded, the alarm signal can also be generated. In a further embodiment, the controller can determine a length of the object (in the y direction) in the passage region and compare it with a defined stored object length range. The defined object length range can also be stored in the record of the object. If the defined object length range is exceeded, the alarm signal can also be generated.

BRIEF DESCRIPTION OF THE DRAWINGS

Various aspects of the improved technology are described in greater detail below with reference to embodiments in conjunction with the drawings. In the drawings, identical elements have identical reference numbers. In the drawings.

DETAILED DESCRIPTION OF EMBODIMENTS OF THE INVENTION

Figure 1:
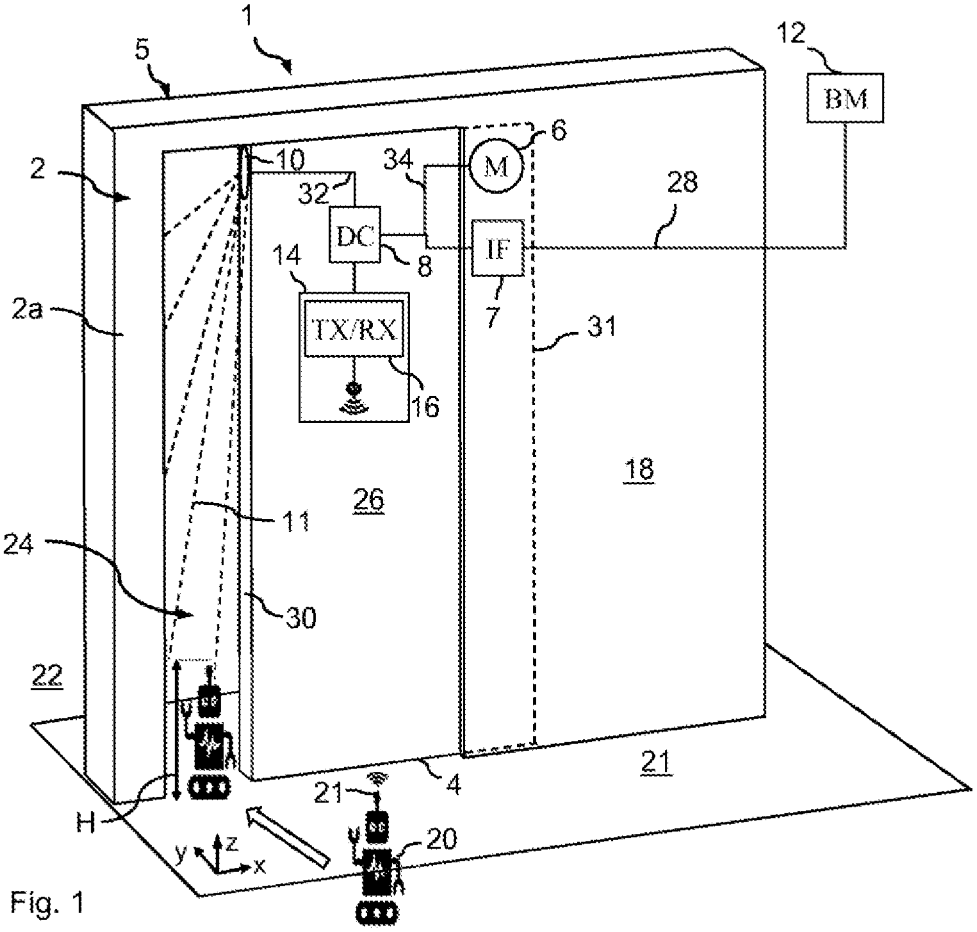
FIG. 1 is a schematic illustration of an exemplary situation in a building having an access control system according to one embodiment.

FIG. 1 is a schematic illustration of an exemplary situation in a building having an access control system 1 which comprises a sliding door system 5 and a controller 8, 10. The sliding door system 5 is inserted into a building wall and represents a physical barrier between a public area 21 and a restricted area 22. In relation to the x-y-z coordinate system drawn in FIG. 1, the building wall extends in a plane that is spanned by the x and z axes. The restricted area 22 can be, e.g., an apartment, an office or another space in a building. The sliding door system 5 can be inserted into a building's inner wall (for access control within the building, e.g., access to an apartment) or in a building's outer wall (for controlling access to the building). As explained in more detail elsewhere in this description, the sliding door system 5 opens a sliding door 4 for an object 20 that is authorized to enter, whereas it remains closed for an object 20 not authorized to enter. The object 20 can be a person, an animal or, as indicated in FIG. 1, a robot. The term "building" in this description is to be understood as meaning residential and/or commercial buildings, sports arenas, airports or ships, for example.

In the situation shown in FIG. 1, the technology described here can be used in an advantageous manner in order to operate the access control system 1 with the highest possible degree of security, although the object 20 can nevertheless be granted access to the restricted area 22 comfortably. Summarized briefly and by way of example, the access control system 1 according to one embodiment is operated as follows: The technology recognizes the object 20 as authorized to enter and opens the sliding door 4 for the object 20 in the direction of the x-axis. The sliding door 4 is only opened as wide as is defined in a user profile for the object 20. In addition, the technology described here determines a height H of the object 20 in the direction of the z-axis and checks whether this height H matches the height also defined in the user profile. If this is not the case, a safety measure (e.g., an alarm) can be triggered. Such a situation can occur, for example, if the sliding door 4 is opened for an object 20 of low height (e.g., child, pet (dog, cat), robot) and an unauthorized person passes through the opened sliding door 4 at the same time or shortly before or shortly after. Exemplary designs of the technology are described in more detail below.

The sliding door system 5 shown in FIG. 1 comprises a door frame 2 and the sliding door 4. The door frame 2 has a passage region 24 and a wall shell region 18 which is designed to at least partially accommodate the sliding door 4. For this purpose, the wall shell region 18 has a structure which forms a cavity which is dimensioned so as to accommodate the sliding door 4. The passage region 24 is the region in the building wall in which it is possible to pass through from one area (21, 22) to the other area (21, 22) in the direction of the y-axis: the passage is between a vertical frame part 2*a* (door post) and the opposite wall shell region 18. Depending on the design, the wall shell region 18 is accommodated in a cavity in the building wall, or the wall shell region 18 can be regarded as part of the building wall, perhaps in the manner of cladding.

Figure 2A:
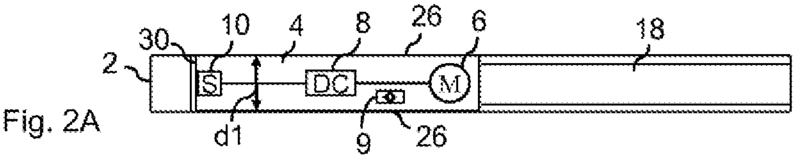
FIG. 2A is a schematic illustration of an exemplary sliding door system in which the sliding door is closed.
Figure 2B:
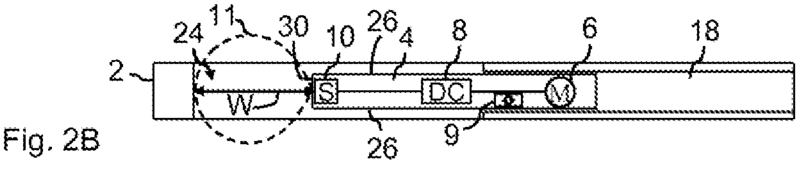
FIG. 2B is a schematic illustration of the sliding door system from FIG. 2A in which the sliding door is in an intermediate position.
Figure 2C:
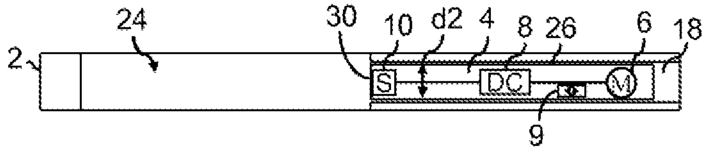
FIG. 2C is a schematic illustration of the sliding door system from FIG. 2A in which the sliding door is in an open position.

The sliding door 4 is displaceable in the door frame 2 between a closed position shown in FIG. 2A and an open position shown in FIG. 2C. In relation to the x-y-z coordinate system drawn in FIG. 1, the sliding door 4 is displaced along the x-axis. In the open position, the sliding door 4 is substantially within the wall shell region 18 in one embodiment. Between these maximum positions, the sliding door 4 can assume an intermediate position shown in FIG. 1, in which the sliding door 4 (and correspondingly the passage region 24) is open to a lesser or greater extent, i.e., an end face 30 of the sliding door 4 has a variable distance from the frame part 2*a*. This variable distance is shown as the opening width W in FIG. 2B.

The sliding door 4 has two substantially parallel door leaves 26 (on an inner side and an outer side of the sliding door 4, respectively). The door leaves 26 are spaced apart from one another (in the y-direction) such that there is an inner space between the door leaves 26 in which system components and insulating material for soundproofing and fire protection can be arranged. The door leaves 26 are connected to one another in the region of the end face 30, as shown for example in FIG. 2A. Each of the door leaves 26 extends parallel to the x-z plane. Further details of the sliding door 4 are disclosed elsewhere in this description.

FIG. 1 also shows a controller 8, 10, a recognition device 14, an interface device 7 and a drive unit 6 (M), which in one embodiment are components of the sliding door system 5. In one embodiment, the sliding door system 5 is connected to a building management system 12 (BM); in the embodiment shown in FIG. 1, this connection is established by means of a communication network 28 to which the building management system 12 and the interface device 7 are coupled. A person skilled in the art would recognize that the building management system 12 can be entirely or partially outsourced to an IT infrastructure for cloud computing (also known as the "Cloud" in colloquial terms). This includes, for example, storing data in a remote data center, but also executing programs that are not installed locally but rather remotely. Depending on the design, a specific function can be made available, for example, in the controller 8, 10 or via the "Cloud." For this purpose, a software application or program parts thereof can be executed in the "Cloud," for example. The controller 8, 10 then accesses this infrastructure via the interface device 7 as required in order to execute the software application.

The communication network 28 can comprise an electronic bus system in an execution system. In one embodiment, the electrical connection of the sliding door system 5, including its supply with electrical energy, is established via the interface device 7. A person skilled in the art would recognize that a plurality of sliding door systems 5 can be provided in the building and that each of these sliding door systems 5 is coupled to the communication network 28 in order to communicate with the building management system 12, for example in conjunction with determining and checking access authorizations, if this is carried out centrally by the building management system 12.

The controller 8, 10 comprises a processor unit 8 (DC) and a sensor unit 10, which is connected to the processor unit 8 by an electrical connection 32. The processor unit 8 is also connected to the drive unit 6 and the interface device 7 by means of an electrical connection 34. The electrical connections 32, 34 are designed for signal and/or energy transmission: for this purpose, they can each comprise individual electrical lines or an electrical bus system.

The processor unit 8 is also connected to the recognition device 14. The recognition device 14 is designed to capture credentials from the object 20, on the basis of which the access control system 1 can determine the access authorization of the object 20. The credentials can, for example, be in the form of a physical key, a manually entered password (e.g., a PIN code), a biometric feature (e.g., fingerprint, iris pattern, speech/voice characteristics) or one of a magnetic card, chip card or RFID card or an (NFC-, Bluetooth- or cellular network-based) access code captured on an electronic device. The object 20 presents the credentials when it wishes to access the restricted area 22.

Corresponding to the mentioned forms which the credentials can take, the credentials can be presented in different ways, for example by a conscious manual action (e.g., entering a PIN code or holding out an RFID card) or by approaching the door to come within radio range of the recognition device 14 (e.g., to establish an RFID or Bluetooth connection). The recognition device 14 can be arranged on the sliding door 4 or in the vicinity thereof; it can be arranged, for example, on an outer side of the sliding door 4 such that it can capture the credentials if the object 20 is in the public area 21.

The recognition device 14 is designed according to the credentials provided in the access control system 1. This means that the recognition device 14 has, for example, a door cylinder, a device for capturing a biometric feature, a device for capturing an optical code, a reader for a magnetic stripe card or a chip card, a keypad or a touch-sensitive screen for manually entering a password, or a transceiver for radio signals. A person skilled in the art would recognize that, in one embodiment, the sliding door system 5 can have more than one recognition device 14, each for a different type of credentials, or that one recognition device 14 is designed for several types of credentials.

In the embodiment shown in FIG. 1, the recognition device 14 captures credentials, which a radio device 21 of the object 20 or a radio device 21 carried by the object 20 transmits as a radio signal. The radio signal can be sent in accordance with a known standard for radio communication (e.g., RFID, WLAN/Wi-Fi, NFC, Bluetooth). Accordingly, the recognition device 14 is designed to receive such a radio signal; for this purpose, a transceiver 16 and an antenna connected thereto are shown in FIG. 1.

The transceiver 16, alone or in conjunction with the processor unit 8, determines the credentials from the received radio signal, which is then used to determine the access authorization. If the credentials are valid, access is granted to the object 20; in this case, the processor unit 8 controls the drive unit 6, which moves the sliding door 4 toward the open position. If the credentials are not valid, the sliding door 4 remains closed and locked.

The sensor unit 10 is arranged on the end face 30 of the sliding door 4, for example in a region of an upper (corner) edge of the sliding door 4. From this elevated region, the sensor unit 10 has an optimized detection field 11 in the direction of the passage region 24 and the floor. An exemplary detection field 11 is shown in FIG. 1 (vertical) and in FIG. 2B (horizontal). In addition, the sensor unit 10 is better protected in this region from dirt and damage (e.g., from vandalism).

According to the technology described here, a (vertical) height of the object 20 is determined using the sensor unit 10. In the present description, the term "height" is used for the extension of the object 20 in the direction of the z-axis; however, the object 20 according to the technology described here can also be a person (for people, their size is usually specified). The height of the object 20 (person, animal or robot) indicates a distance between the floor and a topmost point or region of the object 20. At the instant of determination (measurement instant), the object 20 is on the floor, substantially in the passage region 24. The sensor unit 10 has a fixed and known distance from the floor (floor distance). In this situation, according to one embodiment, an object distance between the sensor unit 10 and the object 20 is determined. The height H of the object 20 results from a difference between the floor distance and the object distance.

In one embodiment, the sensor unit 10 comprises a 3D camera. A camera based on the principle of time-of-flight measurement (TOF sensor) can be used as the 3D camera. The 3D camera comprises a light-emitting diode unit or laser diode unit which, for example, emits light in the infrared range, the light being emitted in short pulses (e.g., several tens of nanoseconds). The 3D camera also comprises a sensor group consisting of a number of light-sensitive elements. The sensor group is connected to a processing chip (e.g., a CMOS sensor chip), which determines the time of flight of the emitted light. The processing chip simultaneously measures the distance to a number of target points in space in a few milliseconds.

The 3D camera can also be based on a measuring principle according to which the time of flight of emitted light is captured over the phase of the light. The phase position when the light is emitted and when it is received is compared and the time elapsed or the distance to the reflecting object is determined therefrom. For this purpose, a modulated light signal is preferably emitted instead of short light pulses. Further details on measurement principles are given, for example, in the following publications: "Fast Range Imaging by CMOS Sensor Array Through Multiple Double Short Time Integration (MDSI)," P. Mengel et al., Siemens AG, Corporate Technology Department, Munich, Germany, and "A CMOS Photosensor Array for 3D Imaging Using Pulsed Laser," R. Jeremias et al., 2001 IEEE International Solid-State Circuits Conference, p. 252. A person skilled in the art would recognize that, as an alternative to such a 3D camera, another device can also be used for determining the object distance, for example, a device based on electromagnetic waves in the radio wavelength range (radar).

The components mentioned (controller 8, 10, recognition device 14, interface device 7, drive unit 6) are arranged on the sliding door 4 and move together with the sliding door 4. In one embodiment, the processor unit 8 is arranged in a region between the door leaves 26, for example in the region of a rear face 31 of the sliding door 4 opposite the end face 30. In one embodiment, the rear face 31 of the sliding door 4 is not visible from the outside because the sliding door 4 can be wider than the passage region 24 and the rear face 31 therefore remains in the wall shell region 18 when the sliding door 4 is in the closed position. The drive unit 6 and the interface device 7 can also be arranged in said region. The electrical connections 32, 34 are accordingly arranged between the door leaves 26 and are not visible from the outside. However, the technology described here is not restricted to this arrangement of the components, which is mentioned by way of example.

Figure 3:
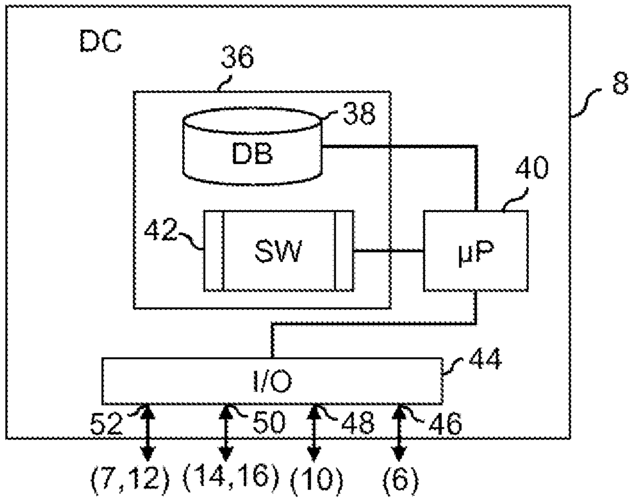
FIG. 3 is a schematic illustration of an embodiment of a controller for the access control system shown in FIG. 1.

FIG. 3 is a schematic illustration of an embodiment of the processor unit 8 for the access control system 1 shown in FIG. 1. The processor unit 8 has an interface device 44 (I/O) which is electrically connected to a processor 40 (uP) and has a plurality of terminals 46, 48, 50, 52 for input and output signals. Terminal 46 is connected to the drive unit 6, terminal 48 to the sensor unit 10, terminal 50 to the recognition device 14 and terminal 52 to the building management system 12 via the interface device 7.

The processor unit 8 also comprises a storage device 36 which is electrically connected to the processor 40. In the embodiment shown, the storage device 36 has a storage area 38 for a database (DB) and a storage area 42 for one or more computer programs (SW) for operating the sliding door system 5. In one embodiment, the operation of the sliding door system 5 comprises opening the sliding door 4 depending on the recognized object 20 and determining the height H of the object 20. The computer program can be executed by the processor 40.

The database stores a record for the object 20 that is authorized to enter the restricted area 22. The stored record is also referred to below as a user profile. The user profile comprises object-specific data, e.g., name, information relating to credentials (key number, PIN code, access code, including biometric data) and any time restrictions for access (e.g., access from Monday to Friday, from 7:00 to 20:00). If a plurality of objects 20 are authorized to enter the restricted area 22, the database stores a user profile for each object 20. As an alternative to creating a user profile in the database of the storage device 36, the user profile can be created in a database of the building management system 12, with the access control system 1 being able to access said database by means of the communication network 28.

According to the technology described here, each user profile also specifies the opening width W (see FIG. 2B) up to which the sliding door 4 is to be opened and the height H of the object 20. The height H of the object 20 can be a maximum height or a height range because, for example, a cat can walk through the passage region 24 with its head lowered or raised and/or its tail raised. In one embodiment, the length (in the y direction) of each object 20 can also be specified. The height H and the length (if present) are plausibility parameters, as explained elsewhere in this description.

These data can be organized in a table, as shown in the following table. The table shows four user profiles for four objects 20 (human, cat, dog, robot). Each object 20 is assigned an identifier (ID) which is linked to the width W and the height H. For example, if the recognition device 14 recognizes the identifier ID=78, then user profile no. 4 for a robot is accessed. In this case, the sliding door 4 is opened approx. 50 cm and the height determined using the sensor unit 10 is compared with the height H=50 stored for the robot. The determined height must lie in a height range that matches the stored height of the object 20, i.e., it must be plausible that it is actually the object 20. Instead of a specific height H, in one embodiment a height range can be specified in the table for one or more (all) objects 20. A person skilled in the art would recognize that the values given in the table are exemplary and can differ from real situations.

| User profile no. | Object | ID | W (cm) | H (cm) |
|---|---|---|---|---|
| 1 | Name | 12 | 70 | 185 |
| 2 | Cat | 34 | 12 | 30 |
| 3 | Dog | 56 | 25 | 50 |
| 4 | Robot | 78 | 50 | 50 |

Figure 4:
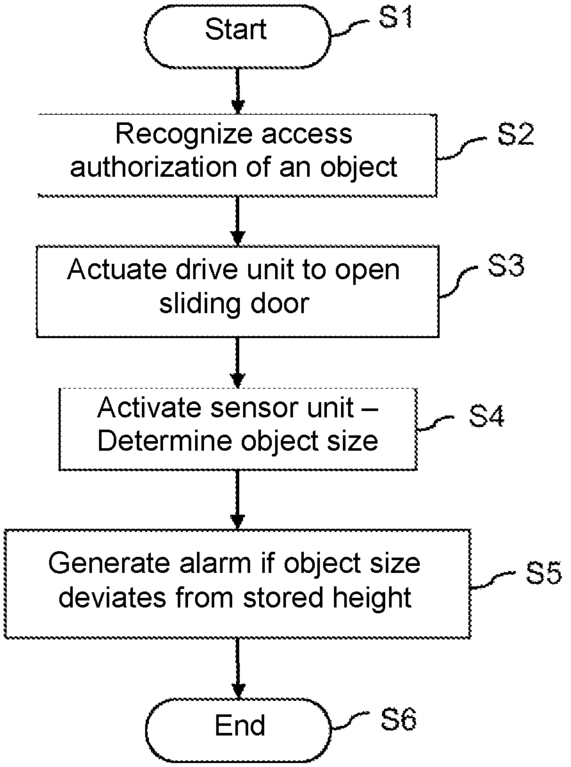
FIG. 4 is a flowchart of an embodiment of a method for operating an access control system.

With an understanding of the basic system components described above and their functions, an exemplary method for operating the access control system 1 based on the situation shown in FIG. 1 is described below in conjunction with FIG. 4. The following is described with reference to the object 20 (robot) which, coming from the public area 21, moves toward the sliding door 4 in order to enter the restricted area 22. The radio device 21 of the object 10 is ready for use. The method shown in FIG. 4 begins with step S1 and ends with step S6. A person skilled in the art would recognize that the division into these steps is exemplary and that one or more of these steps may be divided into one or more sub-steps or that several of the steps may be combined into one step.

In step S2, the recognition device 14 receives credentials of the object 20. The credentials can be in one of the above-mentioned forms. The processor unit 40 checks whether a user profile has been created in the database 38 for the credentials. If this check shows that the object 20 is authorized to enter, the object 20 is recognized as being authorized to enter.

In step S3, the drive unit 6 of the sliding door system 5 is actuated by the controller 8, 10, in particular by the processor unit 8 thereof, in order to open the sliding door 4. As a result, the passage region 24 is opened for the object 20 by moving the sliding door 4 from the substantially closed position into the open position. Part of the sliding door 4 is pushed into the wall shell region 18 of the door frame 2, as shown for example in FIG. 2B. Controlled by the processor unit 40 and taking into consideration the width W stored in the user profile, the drive unit moves the sliding door 4 until the width W is reached.

In step S4, the sensor unit 10 arranged on the end face 30 is activated by the processor unit 8. As explained above, the sensor unit 10 determines the (vertical) height of the object 20 in the passage region 24.

In step S5, an alarm signal is generated by the controller 8, 10 if the height H of the object 20 in the passage region 24, as determined by the sensor unit 10, deviates from the height H or height range stored for said object 20 by a defined degree. The degree of the deviation can be defined in such a way that it is expressed that the determined height H does not match the object 20 at all (is not plausible). If, for example, instead of an expected height H of 50 cm, a height H of 180 cm is determined for a pet, it can be concluded therefrom that not only the pet is passing through the opened sliding door 4, but a person as well. It could also be the case, for example, that an unauthorized person removes a pet's credentials (e.g., RFID tag) in order to try to gain access instead. Similarly, an expected height H of 170 cm does not match a determined height H of 100 cm. For example, this may happen if a child is using a parent's credentials. Although the child is an authorized person, the parents potentially may not want the child to use the credentials.

In the access control system 1, a set of rules can be specified which indicates whether and which action should be triggered after an alarm signal. These actions can be situation-specific, i.e., depending at what time (day or night) and on what day (working day or weekend, vacation time) the alarm signal is generated. Exemplary actions can be: an audible and/or visually perceptible alarm (siren, warning light); automatically notifying security personnel (police or private security service); and automatically notifying a person responsible for the restricted area 22 (tenant, owner, building manager, etc.). A person skilled in the art would recognize that these actions can also be combined.

In one embodiment, the controller 8, 10 can comprise an additional function that determines a dwell time for the object 20 in the passage region 24 and compares it with a defined dwell time. This function is similar to a function for a security door or elevator door, according to which a signal tone sounds if the door is kept open for too long or is blocked. The defined dwell time can also be stored in the record of the object 20. If the defined dwell time is exceeded, the alarm signal can also be generated. This function makes it possible, for example, to reduce the risk of an unauthorized person blocking the open sliding door 4 or manipulating the sensor unit 10.

In a further embodiment, the controller 8, 10 can have a further function. This function determines a length of the object 20 (in the y direction) in the passage region 24 and compares it with a defined stored object length range. The sensor device 10, for example designed as a 3D camera comprising a TOF sensor, has the detection field 11 shown in FIGS. 1 and 2B. In conjunction with the processor unit 8, the length of the object 20 can thus be determined. From an image recording, e.g., a contour of the object 20 can be recognized and its length can be determined therefrom. The defined object length range can also be stored in the record of the object 20. If the defined object length range is exceeded, the alarm signal can also be generated. This function makes it possible, for example, to reduce the risk of an unauthorized person feigning a lower height, but extending their length in the process, when the sliding door 4 is open, for example by crawling on the floor.

Referring again to the positions of the sliding door 4 shown in FIG. 2A-2C, an embodiment of the sliding door system 5 is described below. 2A-2C are each schematic illustrations of a plan view of the sliding door system 5. Each of these plan views show the components comprised by the sliding door 4 (sensor unit 10 (S), processor unit 8 (DC) and drive unit 6 (M)): for the purpose of illustration, the interface device 7 and the connection thereof to the building management system 12 are not shown. The drive unit 6 and the processor unit 8 are arranged inside the sliding door 4, in particular between the door leaves 26. The wall shell region 18 comprising the structure for receiving the sliding door 4 in the open position is also shown in FIG. 2A-2C.

The sensor unit 10 is arranged on the end face 30. The arrangement is selected such that the electromagnetic radiation (light or radio waves) can propagate unhindered toward the passage region 24 during operation. The sensor unit 10 can, e.g., be inserted into a recess in the end face 30 and protected from damage and dirt by a radiation-permeable cover. The electrical connection 32 (FIG. 1) between the sensor unit 10 and the processor unit 8 and the electrical connection 34 (FIG. 1) extend within the sliding door 4, for example between the door leaves 26.

The illustrated embodiment of the sliding door 4 is based on a principle that is similar to a principle known from EP 2876241 A1. Said document describes a sliding door system in which two opposing door surfaces are coupled to an actuator which moves the door surfaces toward or away from one another. In relation to the sliding door system 5 according to the technology described here, this means that the two door leaves 26 have a leaf spacing d1 when the sliding door 4 is in the closed position. During the opening of the sliding door 4, the two door leaves 26 are moved toward one another by means of an actuator 9 (FIG. 2A-2C) until they have a leaf spacing d2 which is dimensioned such that the sliding door 4, when in the fully or partially open position (2B and 2C) thereof, has such a small thickness that it fits into the receiving structure of the wall shell region 18. The leaf spacing d1 is greater than the leaf spacing d2. If the sliding door 4 is pushed out of the wall shell region 18, the two door leaves 26 are moved away from one another (spread apart) such that the sliding door 4 assumes a defined thickness when closed (FIG. 2A). The thickness is determined in such a way that the outer sides of the two door leaves 26 in the closed position are substantially flush with the outer sides of the wall shell region 18 or the cladding thereof. As a result, a substantially smooth finish is achieved on both wall sides in the door region.

In one embodiment, the sliding door system 5 has a guide device on a door cross member, which supports the sliding door 4 and guides it on its path between the closed position and the open position. The sliding door 4 has a complementary device on its upper edge. The guide device and the complementary device cooperate when the drive unit 6 causes the sliding door 4 to move and acts on the complementary device; they can, for example, form a system having a telescopic extension. The drive unit 6 can comprise, for example, a motorized or pneumatic sliding drive which acts on the telescopic extension.

In one embodiment, the two door leaves 26 are moved toward or away from one another by the actuator 9. The actuator 9 can comprise a spreading device which is activated mechanically, electrically or electro-mechanically. The spreading device is designed to move the door leaves 26 toward one another when the sliding door 4 is to be opened, and to move them away from one another when the sliding door 4 is to be closed. A person skilled in the art would recognize that other spreading devices can also be provided instead, for example cylinders actuated by a pressure medium.

The invention claimed is:

1. A system for controlling access to a restricted area in a building, wherein the system comprises a sliding door system and a controller for the sliding door system, wherein the sliding door system comprises a door frame and a sliding door which can be displaced in the door frame between a substantially closed position and an open position by a drive unit actuated by the controller, wherein the door frame has a passage region and a wall shell region which at least partially accommodates the sliding door in the open position, and wherein the sliding door has an end face which faces toward the passage region in the open position; the sliding door system additionally having a recognition device which is communicatively connected to the controller, wherein the recognition device is operable to capture and check credentials presented by an object attempting to gain access to the restricted area;

wherein the controller has a processor unit and a sensor unit, wherein the sensor unit is arranged on the end face of the sliding door and wherein the processor unit is arranged in an inner space of the sliding door and is electrically connected to the sensor unit and the drive unit, wherein the processor unit is operable to access a stored record in a storage device if the credentials are valid, the stored record including an opening width (W) of the sliding door specific for the object and a height range for the object, and wherein the controller is operable to generate an alarm signal if a detected height (H) of the object in the passage region, as determined by the sensor unit, deviates from the height range contained in the stored record for said object.

2. The system according to claim 1, wherein the recognition device comprises a transceiver for radio signals, a device for capturing a biometric feature, a device for capturing an optical code, a reader for a magnetic stripe card or a chip card, a keypad or a touch-sensitive screen for manually entering a password, or a mechanical or electronic door lock.

3. The system according to claim 1, additionally having an interface device which is arranged on the sliding door and is operable to communicate data with a building management system.

4. The system according to claim 1, wherein the drive unit is arranged on the sliding door.

5. The system according to claim 1, wherein the processor unit is operable to determine a dwell time for the object in the passage region and to compare the determined dwell time with a defined dwell time in order to generate the alarm signal if the determined dwell time exceeds the defined dwell time.

6. The system according to claim 1, wherein the processor unit in conjunction with the sensor unit is operable to determine a length of the object and to compare said length with a stored object length range for the object in order to generate the alarm signal if the determined length of the object deviates from the stored object length range for the object.

7. The system according to claim 1, wherein the sliding door comprises an actuator which is operable to position door leaves of the sliding door in a first position with a first leaf spacing between the door leaves when the sliding door is in the substantially closed position and in a second position with a second leaf spacing between the door leaves when the sliding door is in the open position, the first leaf spacing being greater than the second leaf spacing.

8. A method for operating the system for controlling access to the restricted area in the building according to claim 1, the method comprising:

actuating the drive unit by the controller in order to open the passage region of the door frame for the object by moving the sliding door from the substantially closed position to the open position wherein part of the sliding door slides into the wall shell region of the door frame;

activating the sensor unit by the processor unit of the controller, wherein the sensor unit is operable to determine the height (H) of the object in the passage region; and generating the alarm signal by the controller if the detected height (H) of the object in the passage region, as determined by the sensor unit, deviates from the height range contained in the stored record for said object.

9. The method according to claim 8, which also comprises the step of determining if the if the credentials presented by the object are valid.

10. The method according to claim 8, which also comprises the processor unit determining a dwell time for the object in the passage region, comparing the determined dwell time with a defined dwell time and generating the alarm signal if the defined dwell time is exceeded.

11. The method according to claim 8, which also comprises determining a length of the object, comparing the determined length with a stored object length range for the object and generating the alarm signal if the determined length of the object deviates from the stored object length range for the object.

* * * * *